Sept. 17, 1968  R. W. MacDONNELL  3,401,991
SELF-LUBRICATING SIDE BEARINGS
Filed Oct. 18, 1967  5 Sheets-Sheet 1

INVENTOR.
ROBERT W. MacDONNELL,
BY Dressler, Goldsmith
Clement & Gordon.
ATTORNEYS.

Sept. 17, 1968 R. W. MacDONNELL 3,401,991
SELF-LUBRICATING SIDE BEARINGS
Filed Oct. 18, 1967 5 Sheets-Sheet 2
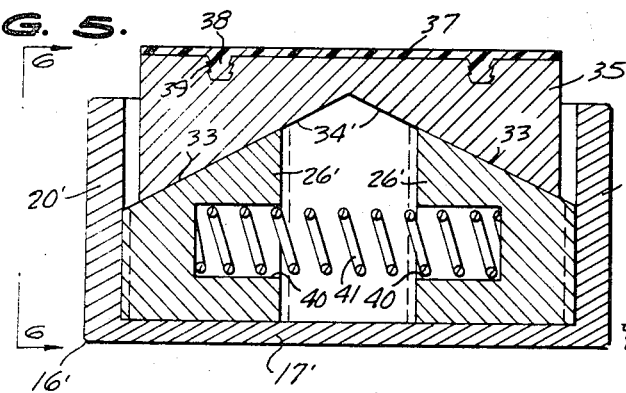
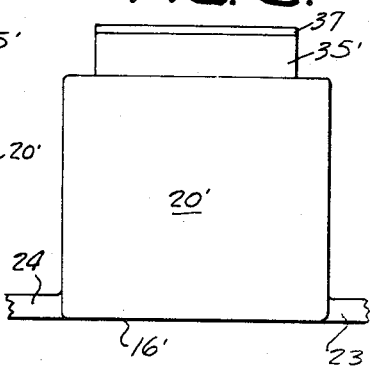
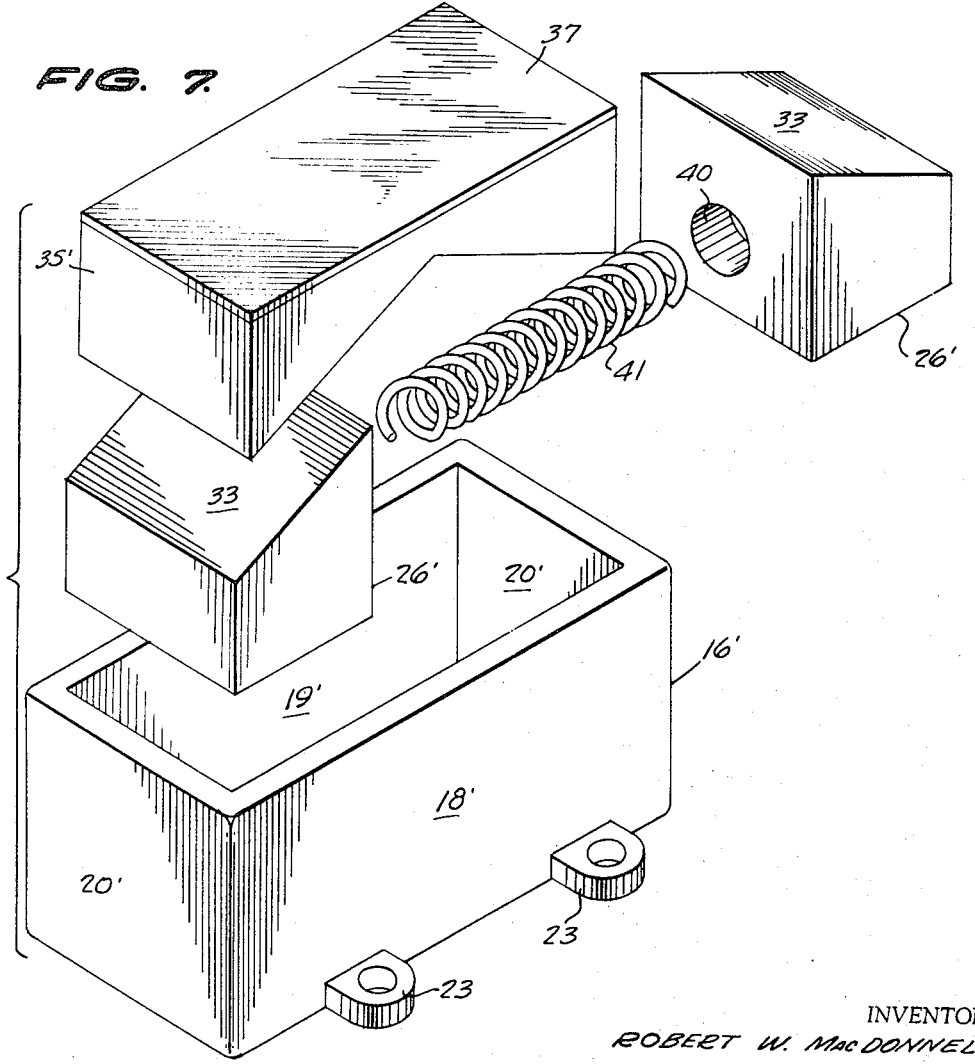
INVENTOR.
ROBERT W. MacDONNELL,
BY
Dressler, Goldsmith
Clement & Gordon
ATTORNEYS.

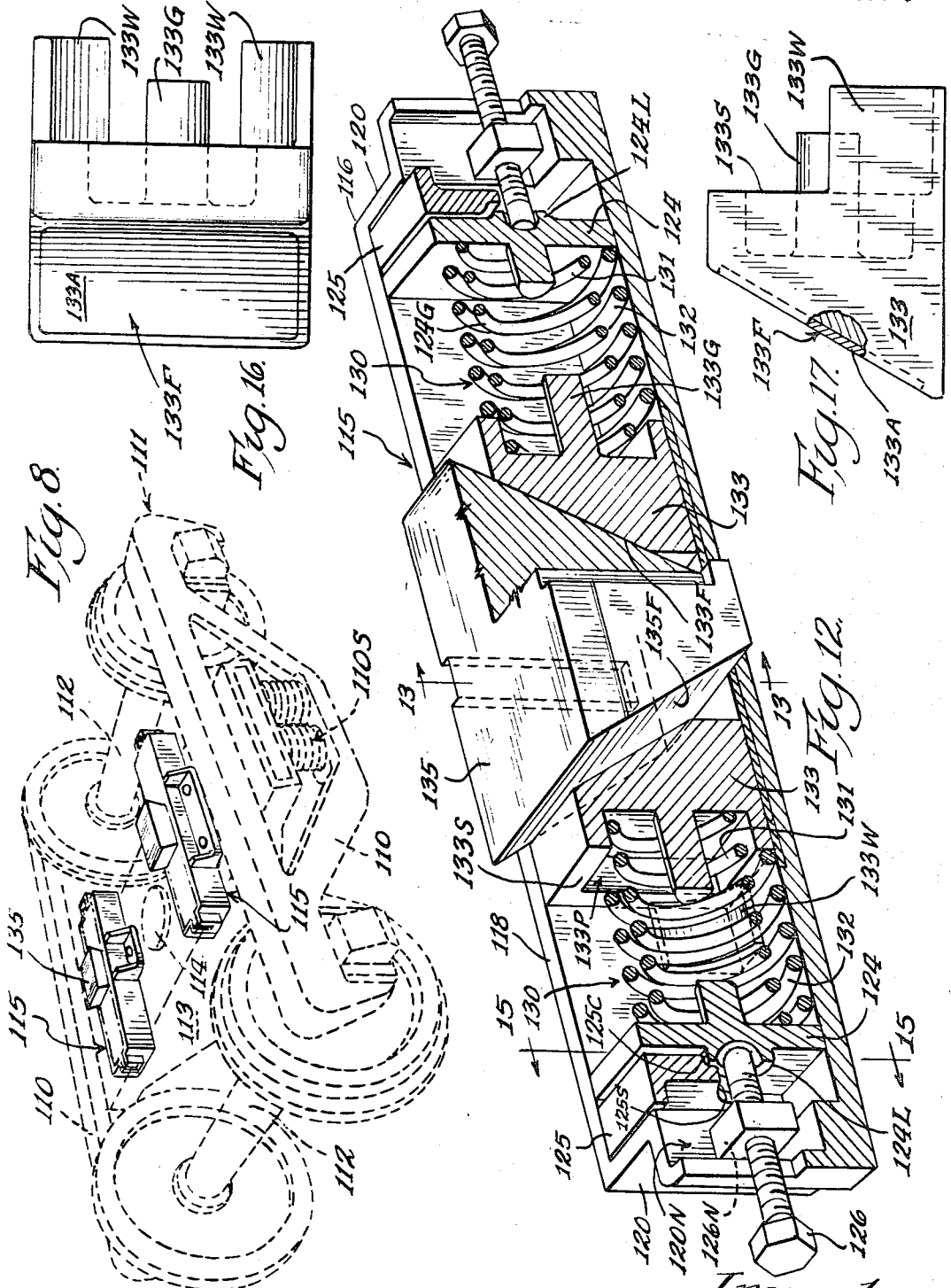

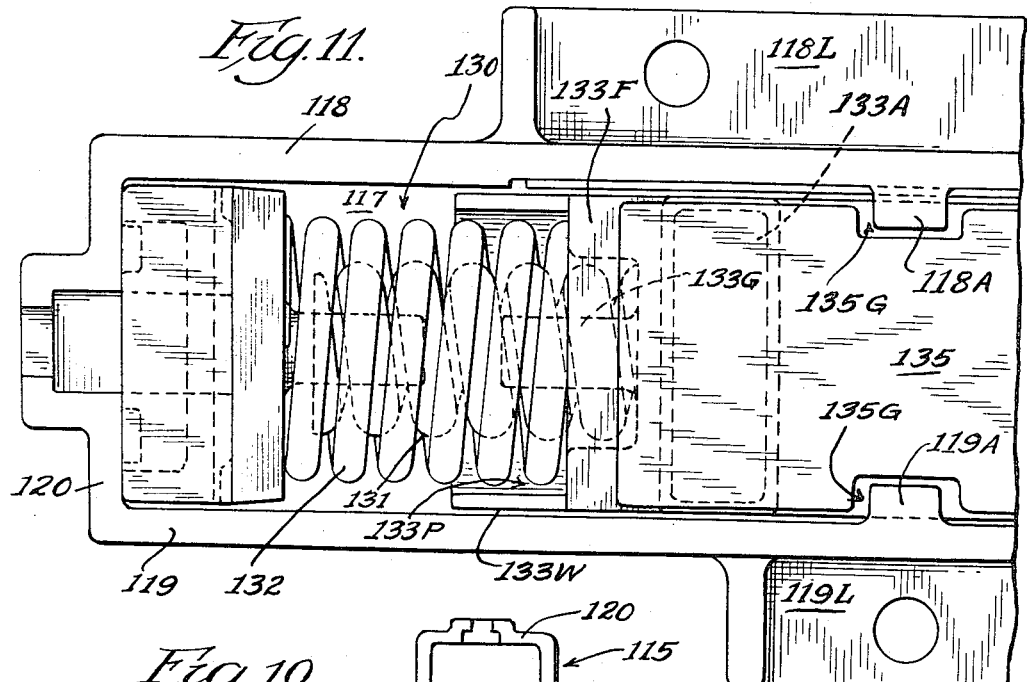
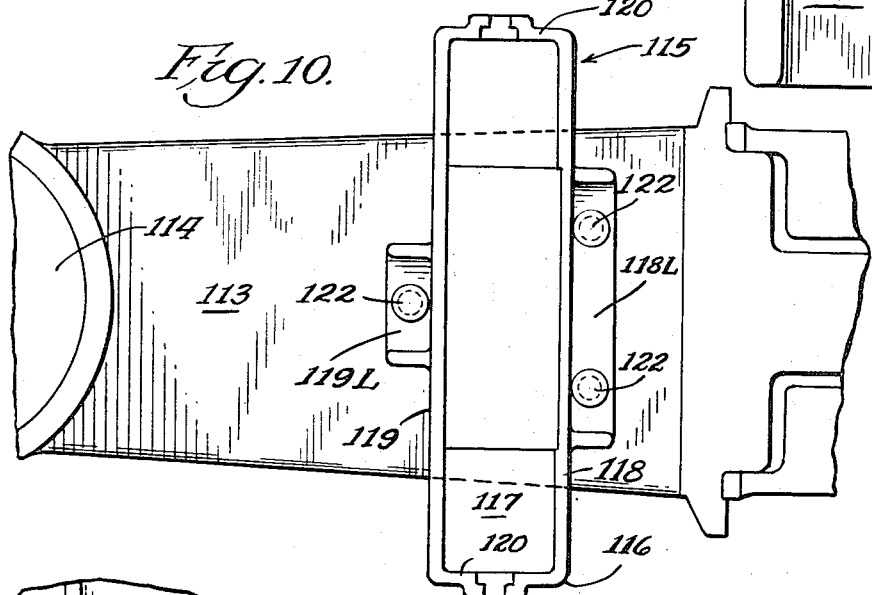
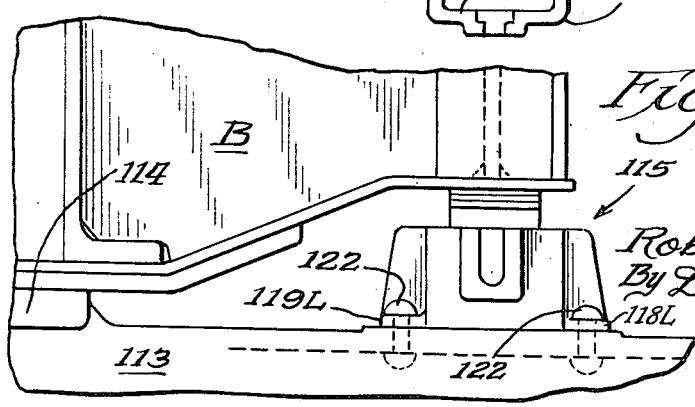

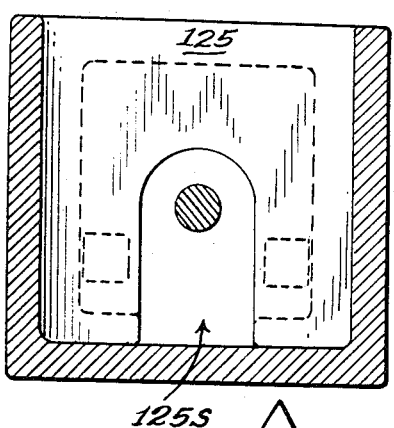
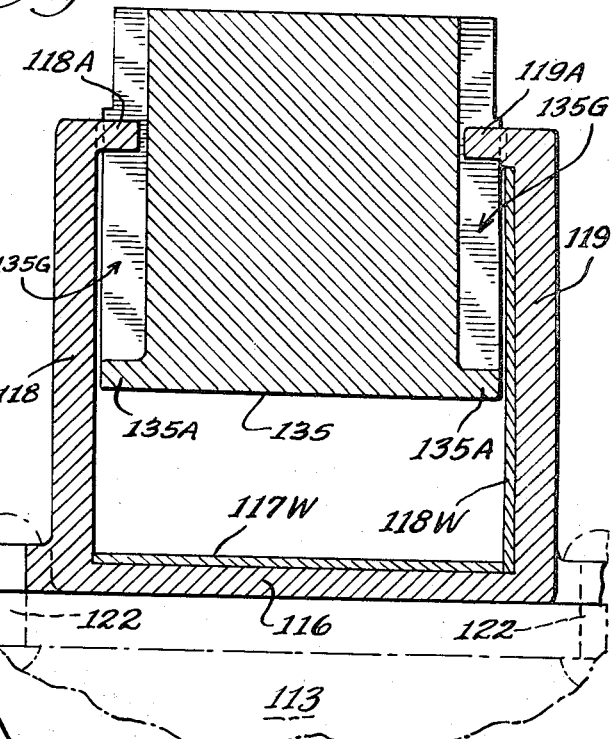
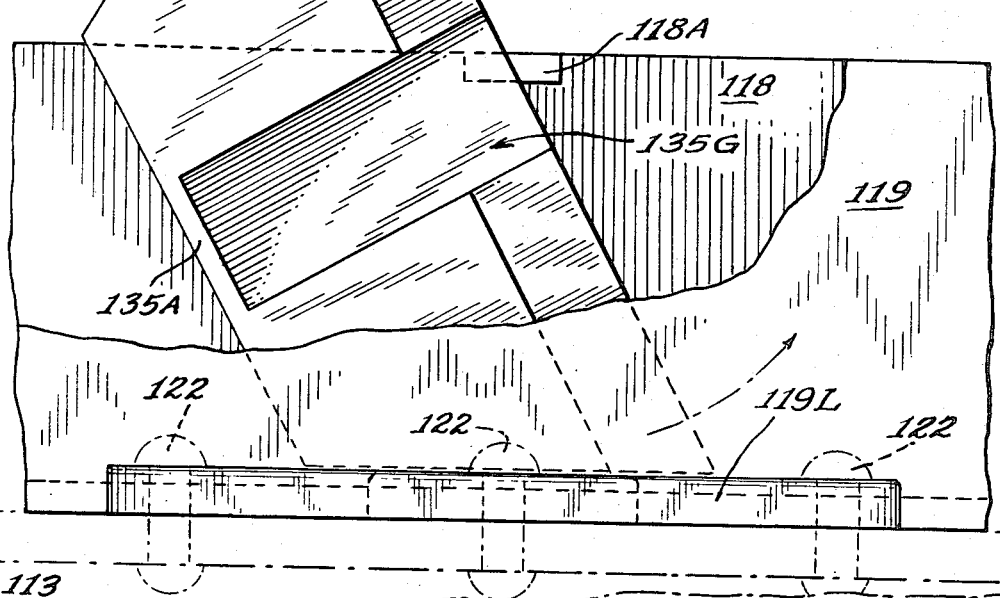

United States Patent Office 3,401,991
Patented Sept. 17, 1968

3,401,991
SELF-LUBRICATING SIDE BEARINGS
Robert W. MacDonnell, Crete, Ill., assignor to Unity Railway Supply Co., Inc., a corporation of Illinois
Continuation-in-part of abandoned application Ser. No. 417,636, Dec. 11, 1964. This application Oct. 18, 1967, Ser. No. 676,259
18 Claims. (Cl. 308—138)

ABSTRACT OF THE DISCLOSURE

Pre-loaded side bearing units are disclosed acting between a railway truck bolster and a car body bolster to control body sway by frictional energy dissipation and to prevent wheel lifts by maintaining pressure on the unloaded truck side. The disclosed side bearing units replace existing conventional side bearings or may be integrated with a modified bolster. Each side bearing unit comprises a housing that carries a pair of wedge blocks in sliding engagement therein, with a floating upper wedge block having oppositely inclined faces engageable with correspondingly inclined faces presented by the sliding blocks. Compression spring means react against opposite end walls of the housing to urge the sliding blocks oppositely and establish the level of pre-loading.

Related application

This application is filed as a continuation-in-part of pending MacDonnell application Ser. No. 417,636, filed Dec. 11, 1964.

Background of the invention

This invention relates to side bearing units interposed between a railway truck bolster and a car body to control body roll. With present day side bearings, there remains a problem that is most acute in the case of high capacity car operations. In the case of high, long or heavy cars or cars with high centers of gravity, the truck wheels actually can lift off the rails upon excessive swaying or bouncing of the car. Wheel lifts occur as a result of car body roll causing a transfer of the car body load from the center plate to the side bearing. This transfer of load to the side bearings brings excessive loading on the truck springs and upon a build up of the swaying action, the truck springs finally go solid on one side so that the other side becomes completely unloaded with the result that the wheels at the unloaded truck side actually can lift.

Summary of the invention

The present invention provides pre-loaded side bearings which serve both to control car body sway by taking up sway energy through friction dissipation and to maintain pressure between the car body and the bolster at the unloaded side thereby preventing wheel lift.

In accordance with the present invention, a pre-loaded side bearing unit comprises a box-like support having a bottom wall and a pair of upstanding end walls, means to secure the support to a railway truck bolster, a pair of wedge blocks slidably mounted on the bottom wall, the wedge blocks having oppositely inclined transversely extending surfaces, an upper block mounted on the wedge blocks and having oppositely inclined underface portions slidably engaged on and mating with the inclined block surfaces, and compression spring means resiliently biasing the wedge blocks in opposite directions to establish a normal position for the wedge blocks and the upper block wherein a central clearance space extends full length between the blocks and wherein the force of the spring means reacts oppositely on the end walls, the upper block having a top wall adapted to supportingly engage the bottom surface portion of a railway car body located above the bolster for stabilizing the car supported on the bolster and for minimizing side sway of the car under operating conditions.

The pre-loaded side bearing units, by maintaining constant downward pressure hold the truck down, reduce nosing of the truck to provide greater wheel flange life and relieve stress on the car body bolster, reducing car wear.

In one embodiment, the upper block has upwardly convergent friction faces engageable with opposite outer faces of the wedge blocks. In one form of this embodiment, an internal compression spring biases the sliding blocks apart to load the end walls and, in another form, a pair of outboard springs bias the sliding blocks apart.

In another embodiment, the upper block is a plunger wedge having downwardly converging friction faces engageable with opposite inner faces of the sliding blocks. Compression springs react against the housing end walls to urge the sliding blocks inwardly in lifting relation against the plunger wedge. Each compression spring assembly is of a double coil type. An outer coil acts throughout the travel of the plunger wedge and determines pre-load forces acting at the pre-load assembled position. An inner coil acts only when the plunger wedge is near or below its pre-load installed position. The plunger wedge has bottom ledges acting as abutments engageable with top edge lugs on the housing to hold the parts assembled against the lifting action of the outer coil springs. Filler blocks insertable between the springs and end walls determine the spring pre-load forces.

Other features and advantages of the invention will be apparent from the following description and claims, and are illustrated in the accompanying drawings which show structure embodying preferred features of the present invention and the principles thereof, and what is now considered to be the best mode in which to apply these principles.

Brief description of the drawings

In the accompanying drawings forming a part of the specification, and in which like numerals are employed to designate like parts throughout the same.

FIG. 5 is a longitudinal vertical cross sectional view, similar to FIG. 2, but showing a modified form of side bearing assembly according to the present invention;

FIG. 6 is an end elevational view of the assembly of FIG. 5, taken substantially on the line 6—6 of FIG 5;

FIG. 7 is an enlarged perspective view showing the components of the side bearing assembly of FIGS. 5 and 6 in separated positions;

FIG. 8 is a perspective view showing a conventional railway car truck in phantom and illustrating another side bearing embodiment in mounted position thereon;

FIG. 9 is a fragmentary elevational view showing the side bearing unit of FIG. 8 in its normal pre-loaded installed position between a truck bolster and a car body bolster with shims being included to illustrate balancing of the unit during initial application;

FIG. 10 is a fragmentary plan view illustrating the mounting position of the side bearing unit on the truck bolster;

FIG. 11 is a top plan view of the side bearing unit when in its pre-loaded assembled condition prior to installation;

FIG. 12 is a perspective view of the side bearing unit when in its pre-loaded installed position, with the view showing the parts in lengthwise section to facilitate disclosure;

FIG. 13 is a transverse section through the side bearing unit and is taken on the line 13—13 of FIG. 12;

FIG. 14 is a fragmentary elevational view, with parts broken away, illustrating assembly of the unit;

FIG. 15 is a transverse section through the unit and is taken on the line 15—15 of FIG. 12;

FIG. 16 is a top plan view of a wedge block; and

FIG. 17 is a side elevation view of the wedge block of FIG. 16.

Description of preferred embodiments

Figure 1:
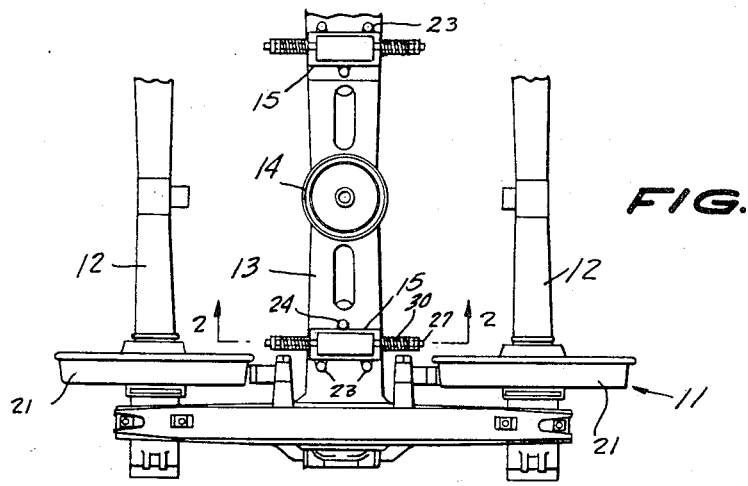
FIG. 1 is a fragmentary top plan view of a railway truck provided with improved side bearing assemblies constructed in accordance with the present invention.

Referring to the drawings, and more particularly to FIGS. 1 to 4, 11 designates a conventional railway truck having the respective wheel axles 12, 12 and the tranversely extending truck bolster 13 carrying the center plate 14 thereon. Mounted on the truck bolster 13 and spaced symmetrically on opposite sides of the center plate 14 are respective side bearing assemblies 15, 15 of identical construction.

Figure 2:
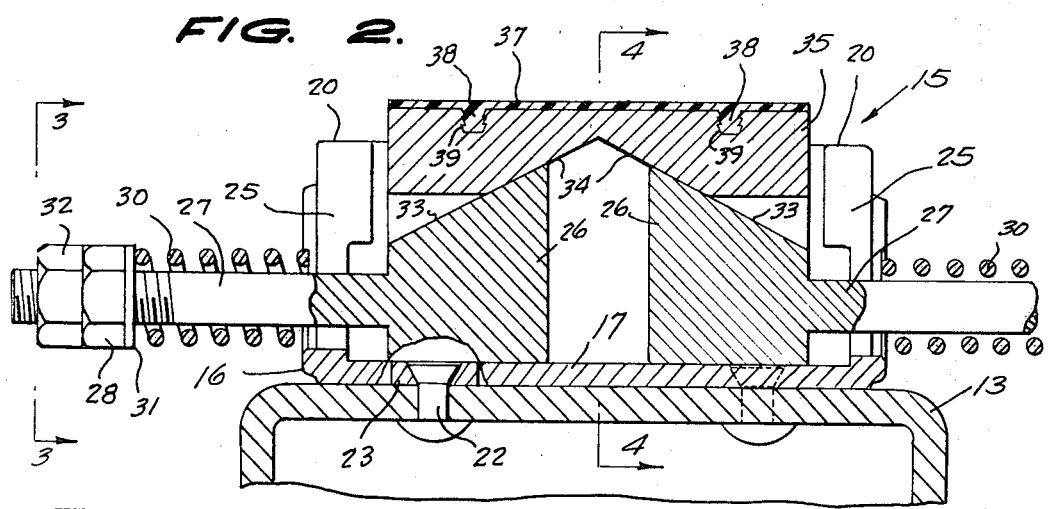
FIG. 2 is an enlarged fragmentary vertical cross sectional view taken substantially on the line 2—2 of FIG 1.
Figures 3, 4:
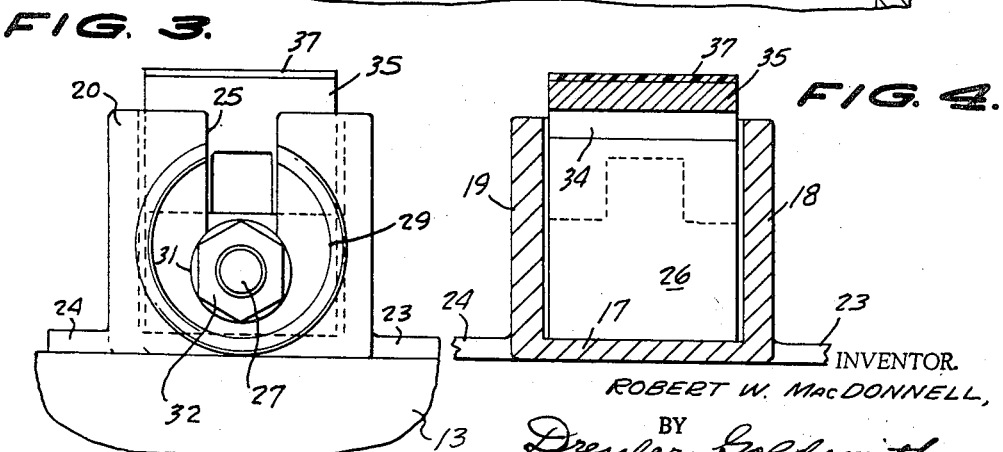
FIG. 3 is an end elevational view taken substantially on the line 3—3 of FIG. 2.
FIG. 4 is a transverse vertical cross sectional view taken substantially on the line 4—4 of FIG. 2.

As shown in FIGS. 2 to 4, each side bearing assembly 15 comprises a generally rectangular, longitudinally extending supporting housing 16 having the bottom wall 17, the longitudinal side walls 18 and 19 and the transversely extending end walls 20, 20, and the housings 16 being secured parallel to and slightly inwardly of the planes of the adjacent truck wheels 21, 21. The bottom wall 17 of each housing 16 is rigidly secured to the bolster 13 in any suitable manner, for example, by means of a plurality of rivets 22. For this purpose, the bottom wall is provided with a pair of outwardly projecting lugs 23, 23 adjacent the side wall 18 and located near the end corners of the housing and is provided with the intermediate outwardly projecting lug 24 adjacent the side wall 19, these lugs being suitably apertured to receive the fastening rivets 22.

The transverse end walls 20, 20 are formed with vertical upwardly facing central slots 25, 25. Designated at 26, 26 are respective transversely extending, longitudinally slidable wedge blocks which are disposed in the housing 16 and which are formed with integral axially extending shafts 27, 27 which project outwardly through the slots 25 and which are provided at their end portions with stop nuts 28 threaded thereon. The outer faces of the end walls 25 are formed with spring seats 29, and surrounding each shaft member 27 is a coiled spring 30 bearing between the adjacent spring seat 29 and a washer 31 engaged on the shaft and bearing against the associated stop nut 28. A lock nut 32 is threaded on the end of each shaft member 27 to lock the adjacent stop nut 28 in a suitably adjusted position to provide a desired normal position of its associated wedge block 26.

As shown in FIG. 2, the wedge blocks 26 are provided with the upwardly and inwardly convergent transversely extending wedging faces 33, 33 which are in sliding engagement with the correspondingly inclined bottom faces 34, 34 of an associated upper block member 35. Thus, the upper block member 35 is formed with the downwardly flaring bottom recess defined by the inlined bottom faces 34, 34, the recess extending transversely and mating with the transversely extending upwardly convergent friction faces 33, 33 of the block members 26, 26.

The top surface of upper block 35 is provided with a lubricating wear pad 37 of suitable self-lubricating material, such as urethane material, containing its own lubricating means and having a relatively low coefficient of friction. The lubricating pad 37 is formed with integral depending lugs 38 which are secured in recesses 39 provided in the upper block 35, the recesses having serrated side walls, as shown in FIG. 2, to frictionally secure the depending lugs 38 therein after they have been once forced downwardly into the recesses. However, the lubricating pad 37 may be removed from the block 35 by pulling it upwardly therefrom, allowing the block 35 to be renewed whenever required without the necessity of discarding the block. The pad 37 may be removed from the associated block 35 by means of any suitable implement for exerting upward force thereon, for example, by means of a screwdriver whose blade may be inserted between the pad 37 and the block 35.

After installation of the side bearing assemblies 15, the nuts 28 are adjusted so as to bring the lubricating pad 37 into firm contact with the under surface of the associated car body and to provide a desirable amount of pre-tension in the springs 30 sufficient to provide the necessary sway-resisting force. The nuts 28 are locked in adjusted positions by tightening the lock nuts 32 thereagainst. In operation, when the car body tends to sway, it exerts a downward force on one side of the upper blocks 35, whereby the bottom surfaces 34 wedgingly cooperate with the inclined top surfaces 33 of the subjacent blocks 26, pulling the blocks 26 inwardly towards each other against the force of their associated coiled springs 30, 30. The block 35 on the opposite side of the truck tends to rise, because of the spring action acting on the subjacent blocks 26, 26, pulling said blocks outwardly and taking up any possible looseness which may occur. The frictional force developed under downward loading at the surfaces 33, 34 cooperate with the compressive forces acting on the springs 30, 30 to provide a snubbing and shock absorbing action whose magnitude can be readily adjusted by the adjustment of the positions of the nuts 28, 28 as above described. The frictional force can be set to any desired amount in accordance with the particular design employed, namely, in accordance with the slope angle of the cooperating frictional surfaces 33, 34.

Referring now to the embodiment illustrated in FIGS. 5 to 7, the side plate assembly shown therein comprises the generally rectangular upwardly facing main housing member 16' having the bottom wall 17', the longitudinally extending side walls 18' and 19' and the transversely extending end walls 20', 20'. Slidably disposed in the housing 16' are the transversely extending bottom wedge blocks 26', 26', having the upwardly convergent top surfaces 33, 33 as in the previously described form of the invention. The blocks 26', 26' are formed with opposing longitudinal bores or recesses 40, 40 receiving the opposite ends of a coiled spring 41 which acts to bias the blocks 26', 26' apart, namely, toward abutment with the respective end walls 20', 20', as shown in FIG. 5. A top block 35', similar to that employed in the previously described form of the invention, is engaged over the bottom wedge blocks 26', 26', the top block 35' having the inclined, downwardly flaring bottom surfaces 34', 34' engaged on and mating with the top surfaces 33, 33 of the bottom friction blocks 26', 26'. A self-lubricating top pad 37 similar to that previously described in connection with the embodiment of FIGS. 1 to 4 is secured on the top surface of the block 35'. The block 35' is provided with the recesses 39 having serrated side walls which lockingly receive the depending integral fastening lugs 38 of the lubricating pad 37.

The operation of the side bearing assembly of FIGS. 5 to 7 is similar to that of FIGS. 1 to 4 in that downward loading on the top block 35', transmitted through the pad 37, is resisted by the combined effects of the frictional force developed between the surfaces 34' and 33 and the compression developed in the coiled spring 41. The spring 41 is of sufficient stiffness to take up all slack and to provide a desired amount of preliminary upward force exerted on the bottom surface of the associated car body to insure the provision of the desired tight anti-sway action.

As will be readily understood, when the side bearing assemblies of FIGS. 5 to 7 are installed and are in position beneath an associated car body, they will be under sufficient normal loading to force them inwardly from the release positions thereof shown in FIG. 5, for example, to the dotted positions thereof shown in this figure, so as to place the spring 41 under a substantial degree of compression and so as to position the blocks 26' sufficiently inward from their release positions so that when the portion of the car body immediately thereabove elevates slightly, allowing the blocks 26' to move away from each other, the blocks 26' will not come into abutment with the end walls 20', 20', namely, so that the lubricating top pad 37 will always engage the bottom surface of the car body.

In both of the forms of the invention above described, downward loading imposed on the top block of the assembly, as where the car body tends to sway, develops frictional resistance between the inclined top surfaces 33 of the bottom blocks and the correspondingly inclined bottom surfaces of the top block, this frictional resistance causing a dissipation of energy and acting to snub or cushion the downward movement of the portion of the car body supported thereby. As previously mentioned, the force acting on the bottom blocks is produced by the associated biasing spring means whose resistance also contributes to the cushioning action.

The embodiments of the invention illustrated and described above employ springs of the coil type. However, if so desired, any other well known type of spring means may be employed, for example, springs of the liquid type.

With reference now to the embodiment shown in FIGS. 8 to 17, a conventional railway truck, as designated generally at 111, includes a pair of side frames 110 that ride on the journal ends of the wheel and axle units 112. Each side frame 110 (FIG. 8) is equipped with a spring group 110S to support opposite ends of a conventional truck bolster 113 which is shown equipped with the usual center plate 114 for receiving the car body bolster B (FIG. 9) in swivelled relation. Side bearing units 115 are shown seated on the bolster 113 and are positioned symmetrically on opposite sides of the center plate to seat on the truck bolster 113 and engage the underface of the car body bolster B.

The side bearing units 115 produce internal frictional sliding movement in resisting side sway of the car body relative to the truck bolster so that the sway energy is continuously dissipated. The stabilizers, as installed, are pre-loaded to the extent shown in FIG. 12 so that, during normal running conditions, the units provide points of contact with the car at both sides instead of just at the center plate 114.

In the embodiment shown in FIGS. 8 to 17, each side bearing unit 15 is illustrated as a separate component to be installed in place of and at the same location as a standard side bearing. The invention also contemplates that the side bearing could be incorporated bodily within the bolster by use of a modified bolster design that provides operating pockets for the movable or live parts of the side bearing units, without requiring any change in the live parts.

The illustrated arrangement comprises a box-like support housing 116 having a bottom wall 117, longitudinal outer and inner side walls 118, 119 and end walls 120, 120, the housing 116 being open at the top. Again, the housing 116, being illustrated as a separate unit, is shown secured to the bolster 113 by a number of fasteners 122 which engage external mounting lugs 118L, 119L.

The live parts shown herein include a pair of wedge blocks or shoes 133 mounted to slide along the bottom wall 117 of the housing, the wedge blocks 133 presenting oppositely transversely extending friction surfaces 133F engageable with corresponding friction surfaces 135F along oppositely inclined underface regions of a floating upper wedge block or plunger 135. In this embodiment, the friction surfaces 133F converge downwardly and the complementary floating block tapers downwardly to provide correspondingly downwardly tapering surfaces 135F for broad faced frictional sliding engagement with the friction block surfaces. The wedge blocks 133 are resiliently biased in opposite directions by compression spring assemblies 130 which in this embodiment act to urge the wedge blocks 133 together. The compression spring assemblies 130 act oppositely on the end walls 120, each assembly being shown reacting through an adjustable spring seat 124 backed by a filler block 125 to transmit the spring load to the corresponding end wall 120.

Each of the wedge blocks 133 has a recessed rear face to provide a spring pocket 133P bounded by a spring seat surface 133S. Integral side and bottom wing portions 133W extend rearwardly from regions flanking the lower half of the spring seat surface 133S and a central guide stem portion 133G projects through the pocket 133P to terminate medially along the winged section. Each of the spring seats 124 has a corresponding guide stem portion 124G projecting towards the guide stem 133G of the corresponding wedge block and has an oppositely projecting rectangular central lug portion 124L provided with a central socket.

Adjustment bolts 126 and captive nuts 126N are removably seated in notched regions 120N provided in each end wall 120, with the bolts 126 projecting into the sockets defined by the lugs 124L to facilitate initial assembly and adjustment of the units. The bolts 126 function simultaneously in holding the spring seats 124 spaced from the end walls 120 a distance sufficient to enable insertion of the filler blocks 125. Thereafter, the bolts 126 are backed off so that the spring forces react through each spring seat 124 and corresponding filler block 125. Each of the filler blocks 125 has a vertical slot 125S to permit the block to be inserted in straddling relation to the shank of the bolt 126 and each block has a complementary central socket 125C bordering the slot 125S and shaped to receive and interlock with the lug portion 124L. The bolts 126 and nuts 126N are removed after the filler blocks 125 are in place.

Each of the spring assemblies 130 includes an inner coil spring 131 and an outer coil spring 132. In the disclosed arrangement, the inner coil spring 131 nests within the spring pocket 133P and is telescoped over and guided by the stem portions 133G and 124G while the outer coil spring 132 seats against the intermediate spring seat surface 133S and is guided by the winged sections 133W.

The upper wedge block 135 acts as a floating plunger working against the spring backed slidable blocks 133. While the spring forces normally act to lift the upper wedge block, it is retained against escape by a mechanical interlock relationship with the housing 116. Thus, the side walls 118, 119 have confronting abutment lugs 118A, 119A centrally along the top edges thereof and the floating block 135 has vertical guideways 135G along opposite side faces thereof and receiving the lugs 118A, 119A. The guideways 135G terminate short of the base of the upper block so that central abutment ledges 135A are provided which are engageable with the abutment lugs 118A, 119A to limit the maximum vertical travel of the plunger block 135. The floating block 135, as shown herein, is 4⅝ inches wide, has a 5 inch long bottom face and a 9¼ inch long top face and is 4 inches high so that its side faces 135F are inclined at an angle of 62° from the horizontal.

In the assembly of the side bearing units, the plunger block 135 is first inserted into the housing 116 adjacent one end thereof and in a canted relationship wherein the friction face 135F seats flush against the bottom wall 117. The plunger block 135 is then slid along the bottom wall towards the canted center position at which it is illustrated in FIG. 14. In this canted center position, the lugs 118A, 119A project partway into the upper ends of the obliquely oriented guideways 135G so that the plunger block can be rotated to a symmetrical position wherein the abutment lugs 118A, 119A extend crosswise in the upper regions of the guideways.

Adequate end clearance now exists in the housing 116 on both sides of the block 135 to permit insertion of the slidable wedge blocks 133, the spring seats 124 and the coil springs 131, 132. The winged sections 133W of the slide blocks serve as a cradle for the end of the outer coil 132, with the interengagement of the cradle and the coil end acting to hold the slide block against tipping during assembly. The bolts 126 are actuated to advance the spring seats 124 from the housing end walls so that the filler blocks 125 can be dropped into place, with the bolts then being backed off to permit the spring reaction to be taken by the filler blocks. The advance of the spring seats 124 develops a spring thrust against the slide blocks to lift the floating block 135 until the ledges 135A engage the lugs 118A, 119A. This is the pre-loaded assembled position of the side bearing and in this position, as is apparent in FIG. 11, the inner coil 131 is not compressed.

In the pre-loaded assembled position assumed prior to installation in the car, the side bearing is held interlocked for safety and convenience in handling and the outer coil springs 132 hold the floating block 135 up to establish a clearance of 3½ inches above the bottom wall.

The side bearing units of this invention are applied at the same location and are direct replacements of the standard side bearings. Where necessary, mounting holes are first drilled into the top of the truck bolster B to accommodate the fasteners 122, as best shown in FIG. 10. When both side bearings are in place on the truck bolster in supporting relation to the car body, the floating block should be depressed to the position shown in FIG. 12 wherein one inch of head clearance exists beneath the floating block. This is the normal pre-loaded installed position and each side bearing has its spring assemblies 130 precompressed to exert a substantial vertical force acting in a lifting direction upon the car and acting to hold the car truck down. An offset ledge 135L is provided along each vertical side face of the floating block 135 to present a gauge line for registry with the upper end of the housing walls 118, 119 to denote the correct normal position of the floating block when the car is at rest on level track.

Where the individual car and car truck environment result in unbalance during initial installation, one or more shims S (see FIG. 9) are inserted between the underface of the body bolster B and the top of the floating block 135 until the ledge 135L indicates that the desired one inch travel clearance has been established at the pre-loaded installed position.

The pre-loaded side bearings of this invention allow a controlled car body roll while continually absorbing and dissipating the roll energy. During roll conditions, the loaded side bearing takes up energy at the downwardly swaying side of the car body while the other side bearing keeps pressure on the unloaded truck side to prevent lifting of the wheels on the unloaded side. Thus, the side bearings allow controlled body roll but prevent wheel lift. It has been shown that the continuous downward pressure on the trucks that characterizes this stabilizing action reduces nosing of the trucks so that wheel flange wear is avoided. The stabilizing action also reduces bolster stress to minimize car wear.

In the disclosed embodiment, the floating block 135 is of No. 5 alloy steel and the sliding blocks 133 are of high tensile manganese bronze, this combination of materials being free of galling and seizing during high pressure frictional sliding engagement. In accordance with a modification shown in FIGS. 16 and 17, shoe facings 133A of a composition fibrous material including asbestos are provided to serve as the friction faces 133F of the sliding blocks, this material being selected to provide higher friction and less heat sensitivity for achieving longer wearing friction faces. Alternatively, the composition shoe facings can be provided to serve as the friction faces of the floating blocks 135 so that the sliding blocks 133 may be of a less expensive alloy material.

As shown in FIGS. 16 and 17, the shoe facings 133A are in the form of rectangular inserts loosely nested in rectangular recesses on the slide faces of the blocks. The shoe facings 133A are readily renewable without the necessity of replacing the entire slide block 133.

The support housing 116 is of any suitable cast steel and is provided with recesses in its bottom wall 117 and its outer side wall 118 each to receive a hardened steel wear plate 117W and 118W, respectively. Each wear plate may be of No. 1095 spring steel and each serves to protect the housing from high friction wear effects. The bottom wear plate 117W is 11½ inches long and is engaged by the underfaces of the sliding blocks 133 while the side wear plate 118W takes lateral thrust effects that are applied to the upper block as an incident to the swaying movement of the car body. The winged sections 113W of the slide blocks 133 extend beyond the bottom wear plate 117W to engage directly against the housing wall 117 but these winged sections, being remote from the vertical line of action of the floating block 135, are not subjected to sustained high pressure wear action.

In a typical application for 90 to 125 ton cars, the inner coil 131 has a spring rate of 77,000 pounds per inch and is a 2 9/16 inch O.D. diameter spring having a free height of 6½ inches and the outer coil 132 has a spring rate of 11,000 pounds per inch and is a 3 7/8 inch O.D. diameter spring having a free height of 8 inches, and a solid height of 4 3/8 inches. In the preloaded assembled position, only the outer coils 132 are precompressed and each exerts a horizontal force of about 1,880 pounds. In the preloaded installed position, each inner coil 131 exerts a horizontal force of about 4,900 pounds and each outer coil 132 exerts a horizontal force of about 3,300 pounds. In fully closed position, each inner coil exerts a horizontal force of about 9,200 pounds and each outer coil exerts a horizontal force of about 3,850 pounds. About 40% of the horizontal spring force translates into vertical force as determined by the 62° angle of the friction faces.

In the side bearing units for 70 ton cars, the inner coil spring does not begin to be compressed until the floating block is within one inch or less of the bottom wall 117.

Thus, while preferred constructional features of the invention are embodied in the structure illustrated herein, it is to be understood that changes and variations may be made by those skilled in the art without departing from the spirit and scope of the appended claims.

What is claimed is:

1. A side bearing assembly comprising a box-like support having a bottom wall and a pair of upstanding end walls, means to secure said support to a railway truck bolster, a pair of wedge blocks slidably mounted on said bottom wall, said wedge blocks having oppositely inclined transversely extending surfaces, an upper block mounted on said wedge blocks and having oppositely inclined underface portions slidably engaged on and mating with said inclined block surfaces, and compression spring means resiliently biasing said wedge blocks in opposite directions to establish a normal position for said wedge blocks and said upper blocks wherein a central clearance space extends full length between said blocks and wherein the force of said spring means reacts oppositely on said end walls, said upper block having a top wall adapted to supportingly engage the bottom surface portion of a railway car body located above the bolster for stabilizing the car supported on said bolster and for minimizing the side sway of said car under operating conditions.

2. A bearing assembly as recited in claim 1 in which the top wall of said upper block has a plurality of transversely extending recesses each having serrated vertical wall surfaces and a bearing pad is mounted on said top wall, said bearing pad being of self lubricating material having integral depending lugs engageable with said serrated wall surfaces, whereby said pad may be readily removed from said top wall for replacement.

3. A bearing assembly as recited in claim 1 in which said inclined surfaces on said wedge blocks and on said upper block converge upwardly at the same angle, whereby said upper block maintains equal spacing relative to both of said wedge blocks throughout their relative movement.

4. A side bearing assembly as recited in claim 1 in which each of said end walls has an open slot, each of said wedge blocks has an integral shaft member extending outwardly through one of said open slots, said compression spring means comprises a compression spring encircling each of said shaft members outwardly of said end walls, and a nut threadingly engages the outer end of each of said shaft members for adjusting the loading of said spring means.

5. In a side bearing assembly as recited in claim 1 wherein said support has outer and inner vertical side walls extending horizontally between said end walls and including confronting top ledge abutment portions centrally therealong, said upper block is a plunger wedge having inclined surfaces that converge downwardly, and wherein said wedge blocks have inclined surfaces that converge downwardly at the same angle, said plunger wedge having vertical side grooves open at the top to receive said abutment portions, said side grooves terminating at the bottom to provide lower edge abutments engageable with said abutment portions to interlock said plunger wedge against vertical escape.

6. In a side bearing assembly as recited in claim 1 wherein said support has outer and inner vertical side walls extending horizontally between said end walls, said outer side wall having an interior surface recess alongside said upper block and a wear plate insert disposed in said recess for engagement by said upper block.

7. In a side bearing assembly as recited in claim 1 wherein said support has a bottom wall recess underlying both of said wedge blocks and a wear plate insert is disposed in said recess for engagement by both of said wedge blocks.

8. In a side bearing assembly as recited in claim 1 wherein said support has outer and inner vertical side walls extending horizontally between said end walls, and wherein said upper block has a horizontal gauge line spaced beneath its upper end to register with an upper extremity of one of said vertical side walls for denoting the normal position of the upper block when installed in load supporting position beneath a railway car body.

9. In a side bearing assembly as recited in claim 1 wherein said upper block is a plunger wedge having inclined surfaces that converge downwardly and wherein said wedge blocks have inclined surfaces that converge downwardly at the same angle.

10. In a side bearing assembly as recited in claim 9 wherein separate compression spring means react horizontally between each end wall and each wedge block.

11. In a side bearing assembly as recited in claim 10 wherein said support has outer and inner vertical side walls extending horizontally between said end walls and including confronting top ledge abutment portions centrally therealong and wherein said plunger wedge has vertical side grooves open at the top to receive said abutment portions, said side grooves terminating at the bottom to provide lower edge abutments engageable with said abutment portions to interlock said plunger wedge against vertical escape and maintain said compression spring means precompressed.

12. In a side bearing assembly as recited in claim 10 wherein each compression spring means is a double coil unit having an outer coil of lower spring constant than the inner coil and establishing the initial preload force.

13. In a side bearing assembly as recited in claim 9 wherein a separate spring seat is shiftably mounted in said support intermediately between each end wall and each wedge block, separate compression spring means engage and act horizontally between each spring seat and each wedge block and a separate filler block is disposed between and transmits compression loads between each end wall and each corresponding spring seat, whereby the thickness of each filler block determines the preload developed by said compression spring means and acting upwardly on said upper block.

14. In a side bearing assembly as recited in claim 13 wherein said support has outer and inner vertical side walls extending horizontally between said end walls and including confronting top ledge abutment portions centrally therealong and wherein said plunger wedge has vertical side grooves open at the top to receive said abutment portions, said side grooves terminating at the bottom to provide lower edge abutments engageable with said abutment portions to interlock said plunger wedge against vertical escape and maintain said compression spring means precompressed.

15. In a side bearing assembly as recited in claim 13 wherein a separate adjustable preload mechanism includes an endwise shiftable shank engageable between each end wall and corresponding spring seat to move the same apart for precompressing said spring means and wherein each filler block has a vertical central slot opening downwardly to fit over said shank and between the corresponding end wall and spring seat to transmit load therebetween upon disengagement of said preload mechanism.

16. In a side bearing assembly as recited in claim 13 wherein each compression spring means is a double coil unit having an outer coil of lower spring constant than the inner coil and establishing the initial preload force.

17. In a side bearing assembly as recited in claim 9 wherein each wedge block has a hollow spring seat recess in its rear face and has rearwardly extending guide wing portions at lower corner regions thereof.

18. In a side bearing assembly as recited in claim 17 wherein each wedge block has a recess in its inclined surface and a shoe insert is nested in the last-named recess to engage one of the inclined surfaces of said upper block.

References Cited

UNITED STATES PATENTS

| | | | |
|---|---|---|---|
| 1,179,755 | 4/1916 | Price et al. | 308—138 |
| 1,290,319 | 1/1919 | O'Conner | 308—138 |
| 1,777,578 | 10/1930 | Roberts | 105—207 |
| 1,808,839 | 6/1931 | Davis | 308—138 |
| 1,853,886 | 4/1932 | Schmidt | 213—24 |
| 1,914,479 | 6/1933 | Brooks | 213—36 |
| 2,541,769 | 2/1951 | Keysor | 308—138 |
| 2,675,276 | 4/1954 | Daugherty | 308—3 |
| 2,680,259 | 6/1954 | Milk | 14—16 |
| 3,054,645 | 9/1962 | Evans | 308—3 |
| 3,243,236 | 3/1966 | Graham | 308—3 |

ARTHUR L. LA POINT, *Primary Examiner.*

H. BELTRAN, *Assistant Examiner.*